(12) United States Patent
Mazza et al.

(10) Patent No.: US 6,916,874 B2
(45) Date of Patent: Jul. 12, 2005

(54) COATING COMPOSITIONS HAVING EPOXY FUNCTIONAL STABILIZER

(75) Inventors: John H. Mazza, Cheswick, PA (US); Jason M. Legleiter, Jefferson Hills, PA (US); Girish G. Parekh, Wexford, PA (US); Grant Schutte, Pittsburgh, PA (US)

(73) Assignee: Valspar Sourcing, Inc., Minneapolis, MN (US)

( * ) Notice: Subject to any disclaimer, the term of this patent is extended or adjusted under 35 U.S.C. 154(b) by 156 days.

(21) Appl. No.: 10/224,183

(22) Filed: Aug. 20, 2002

(65) Prior Publication Data

US 2003/0064185 A1 Apr. 3, 2003

Related U.S. Application Data

(60) Provisional application No. 60/317,734, filed on Sep. 6, 2001, and provisional application No. 60/317,705, filed on Sep. 6, 2001.

(51) Int. Cl.$^7$ .............................................. C08F 220/10
(52) U.S. Cl. ....................... 524/567; 524/569; 524/500; 524/556; 524/55 B
(58) Field of Search ................................. 524/567, 569, 524/500, 556, 558

(56) References Cited

U.S. PATENT DOCUMENTS

| | | |
|---|---|---|
| 3,943,082 A | 3/1976 | Smith et al. |
| 4,496,692 A | 1/1985 | Riew et al. |
| 4,778,851 A | 10/1988 | Henton et al. |
| 4,970,127 A | 11/1990 | Smith et al. |
| 5,082,698 A | 1/1992 | Anderson et al. |
| 5,514,433 A | 5/1996 | Cole |
| 5,641,818 A | 6/1997 | Sweet |
| 5,776,569 A | 7/1998 | Cole |
| 5,891,960 A | 4/1999 | Claar et al. |
| 6,084,036 A | 7/2000 | Carney et al. |
| 6,124,401 A | 9/2000 | Hart, Jr. et al. |
| 6,235,102 B1 * | 5/2001 | Parekh et al. .......... 106/287.22 |

FOREIGN PATENT DOCUMENTS

| | | | |
|---|---|---|---|
| DE | 281 311 A7 | 8/1990 | |
| EP | 0 291 260 A2 | 11/1988 | |
| EP | 0 449 359 A2 | 10/1991 | |
| EP | 0 565 206 A2 | 10/1993 | |
| EP | 0 576 756 A1 | 1/1994 | |
| GB | 2153369 A * | 8/1985 | ........... C08L/33/00 |
| GB | 2 153 369 | 8/1985 | |
| JP | 6-192523 | 7/1994 | |
| JP | 2001-081260 | 3/2001 | |
| JP | 2001081260 A * | 3/2001 | ........... C08L/27/06 |
| WO | WO 98/37159 | 8/1998 | |

OTHER PUBLICATIONS

Dick et al., "Solid State $^{13}$C and In–Situ $^1$H NMR Investigation of Char Formation in PVC and Polychloroprene Degradation," *Polymeric Materials: Science and Engineering*, vol. 83, Fall Meeting, Aug. 20–24, 2000, Washington, D.C., p. 96.

Odian, *Principles of Polymerization*, Third Edition, 1991, John Wiley & Sons, Inc., New York, Chapter 2, pp. 108–119.

Starnes et al., "Poly(Vinyl Chloride) Degradation: Recent Mechanistic Investigations," *Polymer Preprints*, 2001, 42(1):404–405.

Cottier et al., "Identification of potential migrants from a vinylic organosol varnish by gas chromatography–mass spectrometry and liquid chromatography–mass spectrometry," *J. Chromatography A*, 1997, 771:366–373.

Hibino et al., "Preparation of Novel Reactive Plastisol Based on Poly(vinyl chloride) and Multifunctional Acryl Esters," *J. Appl. Polym. Sci.*, 2000, 77:1794–1801.

\* cited by examiner

*Primary Examiner*—David W. Wu
*Assistant Examiner*—Satya Sastri
(74) *Attorney, Agent, or Firm*—Shumaker & Sieffert PA

(57) ABSTRACT

A coating composition including an epoxy functionalized stabilizer with a monomeric unit derived from a glycidyl ester of an α,β-unsaturated acid, or an anhydride thereof; and a thermoplastic dispersion.

24 Claims, No Drawings

COATING COMPOSITIONS HAVING EPOXY FUNCTIONAL STABILIZER

RELATED APPLICATIONS

This application claims priority from U.S. Provisional Application Ser. No. 60/317,734, filed Sep. 6, 2001 and U.S. Provisional Application No. 60/317,705, filed Sep. 6, 2001.

This application is related to an application filed on even date, by application Ser. No. 10/224,120, which is hereby incorporated by reference.

TECHNICAL FIELD

This invention relates to coating compositions and processes for making coating compositions. More particularly, the invention relates to coating compositions having a thermoplastic dispersion stabilized with at least one epoxy-functionalized compound.

BACKGROUND

Conventional container coatings may be derived from a thermally curable formulation that includes particles of a thermoplastic material, typically vinyl chloride polymers (e.g., polyvinylchloride (PVC)), in an organic solvent. When these coatings are applied to a substrate and cured, the thermoplastic can degrade and discolor. To stabilize the thermoplastic material (reduce degradation) during the curing process, epoxy resins such as, for example, polyglycidyl ethers of cyclic polyols like bisphenol A (often referred to as "BADGE") and epoxy novolacs, may be added to the coating formulation. Epoxy novolacs and epoxidized linseed oil have also been used as stabilizers for thermoplastic coating formulations.

Epoxy resins can be made by reacting monomers such as bisphenol-A (isopropylidene-di-phenol) and epichlorohydrin (1-chloro-2,3-oxypropane) to the intermediate bisphenol-A-diglycidylether (BADGE). This reaction often results in a small amount of unreacted BADGE which, in the food packaging industry, could potentially lead to contamination of the packaged foodstuffs. Another commonly used component in coating compositions is bisphenol-A, often used as a reactive diluent. Undesirably, packaged food can extract these monomers and epoxy functional compounds from the cured coating over time.

To reduce potential contamination of the packaged articles, it is desirable to reduce the extractable epoxy content in the coatings applied to food and beverage containers. Epoxy compounds with high epoxy equivalent weights may be used to reduce extractable epoxy content in the coating. However, if standard epoxies with equivalent weights higher than that of epoxy novolac (e.g., about 178) are incorporated in compositions at an effective level, coating performance is compromised, particularly adhesion. In addition, the hydroxyl functional groups in these high molecular weight compounds react with additives such as secondary film formers (e.g., urea-formaldehyde resins, acrylics, and phenolics) in the coating formulation. This reaction increases crosslinking, which decreases the adhesion and flexibility of the coating. A cured coating that is too brittle (e.g., from too much crosslinking) would be inappropriate for use in deeply drawn metal containers, which require sufficient coating flexibility to bend and form.

SUMMARY

In one aspect, the invention is a coating composition including an epoxy functionalized stabilizer with a monomeric unit derived from a glycidyl ester of an I,J-unsaturated acid, or an anhydride thereof; and a thermoplastic dispersion.

In a second aspect, the invention is a method for making a coating composition including
(1) applying to a container a coating composition including:
  (a) an epoxy functionalized stabilizer, wherein the stabilizer is a copolymer including 20% to 90% by weight of a first a monomeric unit derived from a glycidyl ester of an α,β-unsaturated acid, or an anhydride thereof; and 80% to 10% of a second monomeric unit derived from derived from an alkyl (meth)acrylate having the structure:

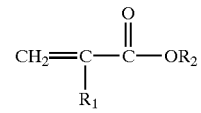

wherein $R_1$ is hydrogen or methyl, and $R_2$ is an alkyl group having one to sixteen carbon atoms; and
  (b) a thermoplastic dispersion; and
(2) curing the coating composition to form a coating.

In a third aspect, the invention is a method for making a coated container including the step of applying the coating composition to a container and curing to form a coated container.

In a fourth aspect, the invention is a method for packaging foodstuffs including applying the coating composition to a substrate, curing to form a coating on the substrate; forming the substrate into a container, and filling the container with a food article.

The coating compositions of the invention stabilize resins made from halogenated polyolefins such as, for example polyvinylchloride, yet the cured coatings are sufficiently flexible for use in deeply drawn metal containers. The coatings adhere well to substrates and protect the thermoplastic components of the composition from thermal breakdown. The acrylic polymer of the present invention can serve multiple functions in the coating composition, including, for example: a reactive diluent and a thermal cross linker. The coating compositions are essentially free or free of epoxy functional compounds and intermediates used to make epoxy functional compounds, such as epoxy novolac, bisphenol-A, bisphenol-F, bisphenol-A diglycidyl ether, and bisphenol-F diglycidylether.

DETAILED DESCRIPTION OF THE PREFERRED EMBODIMENTS

In one embodiment, the invention is a coating composition including a thermoplastic dispersion and an epoxy functionalized stabilizer. The epoxy functionalized stabilizer includes an epoxy functionalized monomeric unit with a carbon-carbon double bond and a pendant oxirane group. Preferably, the monomer is derived from a glycidyl ester of an α,β-unsaturated acid, or an anhydride thereof. The α,β-unsaturated acid can be a monocarboxylic acid or a dicarboxylic acid. Examples of such carboxylic acids include, but are not limited to, acrylic acid, methacrylic acid, ethacrylic acid, α-chloroacrylic acid, α-cyanoacrylic acid, β-methylacrylic acid (crotonic acid), α-phenylacrylic acid, β-acryloxypropionic acid, sorbic acid, α-chlorosorbic acid, angelic acid, cinnamic acid, p-chlorocinnamic acid, β-stearylacrylic acid, itaconic acid, citraconic acid, mesaconic acid, glutaconic acid, aconitic acid, maleic acid, fumaric acid, tricarboxyethylene, maleic anhydride, and mixtures thereof. Specific examples of monomers containing a glycidyl group are glycidyl (meth)acrylate (i.e., glycidyl methacrylate and glycidyl acrylate), mono- and di-glycidyl itaconate, mono- and di-glycidyl maleate, and mono- and di-glycidyl formate. It also is envisioned that allyl glycidyl ether and vinyl glycidyl ether can be used as the monomer.

A preferred epoxy functionalized monomer for use in the stabilizer is glycidyl (meth)acrylate, which has the following structure:

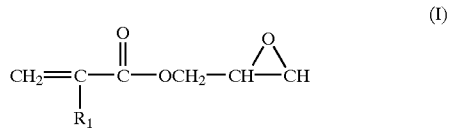
(I)

wherein $R_1$ is hydrogen or methyl. The resulting epoxy functionalized stabilizer is a homopolymer made up of glycidyl (meth)acrylate monomeric units that may be depicted with the following structure:

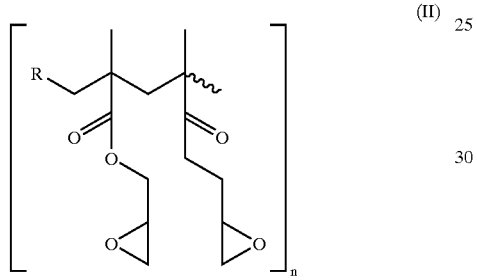
(II)

In another embodiment, the epoxy functionalized monomer may by a copolymer with a general formula $[A-B]_n$, where A is a monomeric unit derived from the epoxy functionalized monomer and B is a monomeric unit derived from an alkyl (meth)acrylate having the structure:

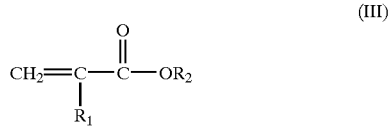
(III)

wherein $R_1$ is hydrogen or methyl, and $R_2$ is an alkyl group containing one to sixteen carbon atoms.

The $R_2$ group can be substituted with one or more, and typically one to three, moieties such as hydroxy, halo, amino, phenyl, and alkoxy, for example. The alkyl (meth) acrylates used in the copolymer therefore encompass hydroxy alkyl (meth)acrylates and aminoalkyl (meth) acrylates. The alkyl (meth)acrylate can be an ester of acrylic or methacrylic acid. Examples of suitable (meth)acrylic acid esters are $C_{1-24}$ alkyl esters or cycloalkyl esters of acrylic or ethacrylic acids, such as methyl acrylate, ethyl acrylate, ropyl acrylate, isopropyl acrylate, n-butyl acrylate, isobutyl acrylate, t-butyl acrylate, hexyl acrylate, 2-ethylhexyl acrylate, n-octyl acrylate, decyl acrylate, stearyl acrylate, lauryl acrylate, cyclohexyl acrylate, methyl methacrylate, ethyl methacrylate, n-propyl methacrylate, isopropyl methacrylate, n-butyl methacrylate, isobutyl methacrylate, t-butyl methacrylate, hexyl methacrylate, 2-ethylhexyl methacrylate, octyl methacrylate, decyl methacrylate, lauryl methacrylate, stearyl methacrylate, cyclohexyl methacrylate, etc.; $C_{2-18}$ alkoxyalkyl esters of acrylic or methacrylic acids, such as methoxybutyl acrylate, methoxybutyl methacrylate, methoxyethyl acrylate, methoxyethyl methacrylate, ethoxybutyl acrylate, ethoxybutyl methacrylate, etc.; and the like.

In an aspect of the invention, $R_1$ is methyl and $R_2$ is an alkyl group having two to eight carbon atoms. In another aspect, $R_1$ can be methyl and $R_2$ can be an alkyl group having two to four carbon atoms. Examples of the alkyl (meth)acrylate include, but are not limited to, methyl, ethyl, propyl, isopropyl, butyl, isobutyl, pentyl, isoamyl, hexyl, 2-aminoethyl, 2-hydroxyethyl, 2-ethylhexyl, cyclohexyl, decyl, isodecyl, benzyl, 2-hydroxypropyl, lauryl, isobornyl, octyl, and nonyl-(meth)acrylates.

In a preferred embodiment, the epoxy functinalized stabilzier is a copolymer made from ethyl methacrylate (EMA), and glycidyl methacrylate (GMA), where a resultant reaction product can comprise units such as those with the following structure:

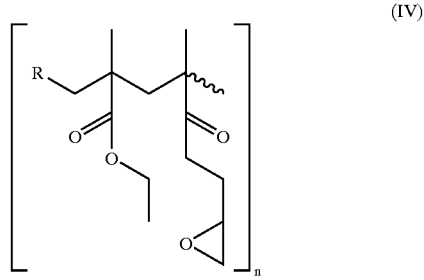
(IV)

In another embodiment, the epoxy functional stabilizer has the general structure $[A-B-C]_n$, where A is a monomeric unit derived from the epoxy functionalized monomer, B is a monomeric unit derived from the alkyl (meth) acrylate of formula (III), and C is a monomeric unit derived from a monounsaturated monomer. The monounsaturated monomeric units that may be incorporated into the epoxy functionalized/alkyl (meth)acrylate copolymer are derived from monomers including, but are not limited to, vinyl monomers, like styrene, a halostyrene, isoprene, diallylphthalate, α-methylstyrene, vinyl toluene, vinyl naphthalene, and mixtures thereof. Other suitable polymerizable vinyl monomers include acrylonitrile, acrylamide, methacrylamide, methacrylonitrile, vinyl acetate, vinyl propionate, vinyl butyrate, vinyl stearate, isobutoxymethyl acrylamide, and the like. Other suitable polymerizable monomers are styrene derivatives; acrylates such as ethyl acrylate, butyl acrylate, methyl ethacrylate; and other similar polymeric materials. Additional examples of hydrocarbon ring-containing unsaturated monomers suitable for incorporation into the stabilizer include styrene, α-methylstyrene, phenyl (meth)acrylate, phenylethyl (meth)acrylate, phenylpropyl (meth)acrylate, benzyl (meth)acrylate, phenoxyethyl (meth)acrylate, cyclohexyl (meth)acrylate, 2-acryloyloxyethylhydrogen phthalate, 2-acryloyloxypropylhydrogen phthalate, 2-acryloyloxypropylhexahydrohydrogen phthalate, 2-acryloyloxypropyltetrahydrohydrogen phthalate, ester of p-t-butyl-benzoic acid with hydroxyethyl (meth)acrylate, dicyclopentenyl (meth)acrylate, etc.

The epoxy functionalized monomer preferably is present in the stabilizer at a concentration no less than about 10 wt. % of the polymer, and up to about 100 wt. % of the polymer. The stabilizer preferably includes about 20 wt. % to about 90 wt. % of the epoxy functionalized monomer.

Preferably, the epoxy functionalized stabilizer can have a weight average molecular weight ($M_w$) of about 2,000 to about 15,000. More preferably, the stabilizer has a weight average molecular weight of about 4,000 to about 8,000.

The epoxy-functionalized stabilizer may be made by a variety of methods. For example, the epoxy functionalized stabilizer can initially be a copolymer of an α,β-unsaturated acid and an alkyl (meth)acrylate, which then is reacted with a glycidyl halide or tosylate, e.g., glycidyl chloride, to position pendant glycidyl groups on the acrylate polymer. The α,β-unsaturated carboxylic acid can be an acid listed above, for example.

Alternatively, an acrylate polymer having pendant hydroxyl groups can be formed in a first step, followed by a subsequent reaction to position pendant glycidyl groups on the acrylate polymer. The acrylate polymer having pendant hydroxyl groups can be prepared by incorporating a monomer like 2-hydroxyethyl methacrylate or 3-hydroxypropyl methacrylate into the acrylate copolymer.

The epoxy functionalized monomer (or precursor thereof), alkyl (meth)acrylate, and optional monounsaturated monomers can be polymerized by standard free radical polymerization techniques, e.g., using initiators such as peroxides or peroxy esters. In the preparation of the copolymer, a chain transfer agent, such as isopropyl alcohol or n-dodecyl mercaptan, can be used to control the molecular weight of the polymer.

The monomers are preferably reacted in the presence of a suitable initiator system. The choice of initiator will depend on a variety of factors, including the desired reaction temperature and pressure. Preferred initiators are somewhat more stable ones (i.e., those having a lower-energy free radical). Suitable initiators process include, for example, peroxides, and azoalkanes (e.g., VAZO 52-2,2'-azobis (2,4-dimethylpentanenitrile), VAZO 64-2,2'-azobis (2-methylpropanenitrile), VAZO 67-2,2'-azobis (2,4-methylbutanenitrile), and VAZO 88-1,1'-azobis (cylcolhexanecarbonitrile) available from E. I. DuPont deNemours & Co.; Wilmington, Del.).

In an aspect of the invention, the initiator system can be ditertbutyl peroxide, having a concentration of about 4 wt. % to about 7 wt. % of the monomers. This range may vary depending upon the molecular weight of the polymer desired.

In preparing the epoxy functionalized stabilizer, the reaction temperatures can be between about 90° C. to about 200° C.; preferably between about 140° C. to about 160° C. This temperature range, however, can be adjusted depending on the type of initiator system used and its concentration.

The monomers are preferably reacted for a time sufficient to polymerize the monomers to a monomer to polymer conversion percentage of at least about 95% by weight, more preferably to a conversion percentage of at least about 98%, most preferably to a conversion percentage of at least about 99%, and optimally to a conversion percentage of at least about 99.5%.

In an embodiment of the invention, the reaction is conducted at ambient pressure. Ambient pressure is often preferred because the equipment costs can be minimized.

A thermoplastic dispersion is a composition having particles of thermoplastic material dispersed in a liquid carrier. Suitable liquid carriers include an organic solvent, a plasticizer, or a combination of the two. Suitable organic solvents include, for example, polar solvents such as ketones (e.g., MIBK and DIBK), glycol ethers, alcohols, aliphatic hydrocarbons, aromatic hydrocarbons, or combinations thereof. It is advantageous to choose a solvent that has an affinity to the thermoplastic material and/or one that can swell the thermoplastic particles to help increase viscosity. Furthermore, preferred carriers have sufficient volatility to evaporate substantially in its entirety from the coating composition during the curing process.

When the liquid carrier comprises an organic solvent or a combination of an organic solvent and a plasticizer, it is often referred to as an organosol. Organosols useful in the compositions of the invention, include, for example, vinyl organosols. A "vinyl organosol", as used herein, is a dispersion of vinyl chloride polymers (preferably high molecular weight vinyl chloride polymers) in a liquid carrier. Suitable vinyl chloride polymers can have a molecular weight of about 50,000 to about 300,000; preferably between about 75,000 to about 200,000; more preferably between about 100,000 to about 150,000.

"Plastisols" are dispersions that have the thermoplastic particles dispersed in a plasticizer. Examples of suitable plasticizers include phthalates, phosphates, adipates, sebacates, epoxidized oils, and polyesters.

Suitable thermoplastic materials are halogenated polyolefins, which include, for example, the copolymers and homopolymers of vinyl chloride, vinylidenefluoride and its copolymers and homopolymers, polychloroprene, polychloroisoprene, polychlorobutylene, and combinations thereof. In a preferred aspect of the invention, polyvinylchloride (PVC) is a suitable thermoplastic material.

In applications involving packaging coatings, dispersion grade particles are preferred, where the particles range from about 0 to about 5 microns. Other sizes, however, can be used, such as non-dispersion grade particles that range from about 5 to about 100 microns.

The coating compositions of the invention may optionally include other additives and agents. Suitable additives include, for example, those that improve the processability or manufacturability of the composition, enhance composition aesthetics, or to improve a particular functional property or characteristic of the coating composition or the cured composition resulting therefrom, such as adhesion to a substrate. Additives that may be included are carriers, emulsifiers, pigments, fillers, anti-migration aids, anti-microbials, extenders, curing agents, lubricants, coalescents, wetting agents, biocides, plasticizers, crosslinking agents, antifoaming agents, colorants, waxes, anti-oxidants, anticorrosion agents, flow control agents, thixotropic agents, dispersants, adhesion promoters, UV stabilizers or combinations thereof. Each optional ingredient can be included in a sufficient amount to serve its intended purpose, but not in such an amount to adversely affect a coating composition or a cured coating composition resulting therefrom.

In addition, the coating composition may also include one or more secondary film forming compounds that are integrally associated with the thermoplastic material particles. Suitable secondary film forming compounds include, for example, acrylic resins and benzo guanamine-formaldehyde, phenolics, melamine formaldehyde, and other urea formaldehyde resins. The coating composition may also include one or more acid catalysts for curing the secondary film forming compounds. Suitable acid catalysts include phosphoric acid, citric acid, dinonylnaphthalene disulfonic acid (DNNSA), dodecylbenzene disulfonic acid (DDBSA), p-toluene sulfonic acid (p-TSA), dinonylnaphthalene disulfonic acid (DNNDSA), phenyl acid phosphate (PAP), and alkyl acid phosphate (AAP).

Plasticizers can also be incorporated in the dispersion. Additional organic solvents can be added as diluents (e.g., aromatic solvents) to alter the application characteristics and adjust viscosity and fluidity for ease of processing and application.

Preparation of thermoplastic dispersion can be performed by any known methods of mixing or blending components that provides high speed mixing for sufficient suspension and dispersion of the particles. Process methods that can be used include, for example, solution blending, high speed dispersion, high speed milling, and the like. Substantially homogeneous dispersion of the particles throughout the liquid carrier would indicate an adequate mixture or blend. The thermoplastic particles remain substantially undissolved in the liquid carrier.

To prepare the coating compositions of the invention, the dispersion is generally made in a first step (a dispersion phase) where the composition is thickened and has somewhat higher solids than the subsequent phase, often referred to as the "let down," where the components (e.g. addition of the stabilizer) are stirred at a slower rate. Process methods to make the coating compositions of the invention include admixture, blending, paddle stir, etc.

The coating composition of the invention can comprise about 5% to about 10% acrylic polymer, by weight, of nonvolatile material.

The coating composition can be applied to a substrate using procedures known in the art, including spray coating, roll coating, coil coating, curtain coating, immersion coating, meniscus coating, kiss coating, blade coating, knife coating, dip coating, slot coating, slide coating, and the like, as well as other types of premetered coating. In an aspect where the coating is used to coat metal sheets or coils, the coating can be applied by roll coating.

After applying the coating composition onto a substrate, the composition can be cured using a variety of processes, including, for example, oven baking by either conventional or convectional methods, or any other method that provides an elevated temperature that allows the thermoplastic material particles to fuse together. The curing process may be performed in either discrete or combined steps. For example, substrates can be dried at ambient temperature to leave the coating compositions in a largely un-crosslinked state. The coated substrates can then be heated to fully cure the compositions. In certain instances, coating compositions of the invention can be dried and heated in one step.

The curing process may be performed at temperatures in the range of about 350° F. (177° C.) to about 450° F. (232° C.), taking into account, however that the upper end of the temperature range can change, depending on up to the decomposition temperature of the thermoplastic material. PVC, for example, begins to degrade at about 370° F. (188° C.), while other materials may degrade at higher temperatures. In the situations where PVC is used and the substrate coated is in metal sheet form, curing can be performed at about 350° F. (177° C.) to about 400° F. (205° C.) for about 5 to about 15 minutes. Where the coating compositions are applied on metal coils, curing is typically conducted at temperatures of about 420° F. (210° C.) to 450° F. (232° C.) for about 5–30 seconds.

The cured coatings of the invention are particularly well suited as coatings for metal cans or containers, although many other types of substrates or packaging materials can be coated. Substrates may be coated with at least one layer of the coating then cured before the substrate is formed and shaped. Where metal cans or containers are formed, the coating may be present on the inside of the containers, the outside of the containers, and/or the ends of the containers. The cured coatings of the invention adhere well to metal and provide substrates with high levels of resistance to corrosion or degradation that may be caused by food or beverage products.

The invention will now be described with reference to the following non-limiting examples.

EXAMPLES

The following examples are merely for illustrative purposes only and are not meant to limit the scope of the appended claims, since numerous modifications and variations will be apparent to those skilled in the art. All parts, percentages, ratios, etc. in the example and the balance of the written description are by weight unless otherwise indicated.

Test Methods

Corrosion Evaluation

Samples are evaluated from about arm's length distance with an unaided eye. Blisters and/or reddish rust are indications of corrosion. A number between 0 and 10 (inclusive) is given to "rate" the amount of corrosion observed. A rating of "3" would indicate 30% of the coating was un-corroded, a rating of 7 would indicate 70% remained un-corroded, etc.

Surface Stain Evaluation

Samples are evaluated from about arm's length distance with an unaided eye to look for discoloration of the coating. A number between 0 and 10 (inclusive) is given to "rate" the amount of staining observed on the coating. A rating of "3" would indicate 30% of the coating was un-stained, a rating of 7 would indicate 70% was unstained, etc. For fish food pack tests, the following criteria is followed: for salmon, a pinkish to reddish color indicates staining; for tuna, a brownish to blackish color indicates staining.

Blush Evaluation

Samples are evaluated from about arm's length distance with an unaided eye. A number between 0 and 10 (inclusive) is given to "rate" the amount of blushing observed. A rating of "3" would indicate 30% of the coating was un-blushed, a rating of 7 would indicate 70% was un-blushed, etc. Blushing is indicative of water entrapment in the coating.

Adhesion Test

Beaded cans drawn to 54 mm×51 mm are made using a commercial can press (E. W. Bliss Co.; Hastings, Mich.). Cans are washed in detergent solution (1 oz. liquid detergent to 1 gallon of tap water) then rinsed with clean water. The coated surface is then cross-hatched with a scribe by making four parallel lines, approximately two tenths inch apart and approximately one and one half inches long, intersected at 90 degrees with four additional lines similarly spaced. A strip of Scotch Cellophane Tape (1" wide, Product #610; 3M Co. Maplewood, Minn.) approximately three inches long is pressed diagonally across the scribed squares. The tape is pressed down firmly with the finger. The tape is then removed with a quick pull from the panel. The removal of the tape should be a peeling back motion rather than a direct lifting motion, where the angle of pull should be approximately 150°. Adhesion is rated on the basis of how much of the coating in the scribed squares is removed. No coating removal is rated 10 (no failure), and complete removal of the coating is rated 0, (i.e., complete failure). Intermediate ratings are estimated as the percentage of coating which has not been removed, for example, if 80% of the coating remains, the sample is given a rating of "8"; and a rating of "3" would indicate that 30% of the cured coating remained adhered to the substrate.

Table of Abbreviations

| Trade Designation, Abbreviation, or Name | Source (City, State) | Description |
|---|---|---|
| Butyl CELLOSOLVE | Eastman (Kingsport, TN) | Ethylene glycol butyl ether |
| EMA | | Ethyl methacrylate |
| GMA | | Glycidyl methacrylate |
| MIBK | Union Carbide (Institute, WV) | Methyl isobutyl ketone |
| VMCH | Union Carbide (Texas City, TX) | Solution vinyl |
| Cymel 5010 | Cytec Industries (Wellingford, CT) | Benzoguanamine formaldehyde resin |
| SL-404 | Elementis (Jersey City, NJ) | Polymeric wax dispersion |
| DEN 438 | Dow Chemical (Texas City, TX) | Epoxy novolac |
| Toluene | ExxonMobile (Houston, TX) | |
| Isophorone | Creanova (Parsippany, NJ) | |
| Phosphoric Acid 85% | Astaris (St. Louis, MO) | |
| Carnauba Wax Dispersion | Michelman (Cincinnati, OH) | |
| Aluminum Pigment Paste | Silberline (Tamaqua, PA) | |

Preparatory Example 1

A reaction flask was equipped with a stirrer, condenser tube, and inert gas inlet charged with 77.0 g of diethyleneglycol diethylether. A sparge of nitrogen was started and some light agitation of the reaction flask initiated. The temperature of the flask was set for 150° C. In a separate vessel, the monomer/initiator pre-mix was mixed: 240.0 g (2.10 mol) of EMA, 60.0 g (0.42 mol) of GMA, and 18 g (0.12 mol) of di-tertbutyl peroxide. Once the diethyleneglycol diethylether had reached 150° C., the addition of the monomer/initiator premix was started. The initiator/monomer mixture was added over a period of about 120 minutes. When the addition was completed, the temperature of the reaction flask was maintained for an additional 180 minutes to complete the polymerization process. A temperature range of 150–155° C. was maintained throughout the reaction time. Following this 180 minute hold period, the reaction flask was allowed to cool, under gentle agitation, while the final addition of MIBK, 135 g, occurred over a 45-minute period. The polymer was discharged and characterized for solution/chemical properties.

The acrylic polymer yielded the following characteristics: a Molecular Mass ($M_w$) of 7,630 Daltons (determined using Gel Permeation Chromatography (GPC from Perkin Elmer; Norwalk, Conn.; columns from Toso Biosep; Montgomeryville, Pa.)); a Molecular Mass ($M_n$) (also determined by Gel Permeation Chromatography) of 2160 Daltons; Non-volatile Mass or Solids Content (20 minutes at 204° C.) of 56.4% by Weight; and an Epoxy Value (using Titration with tetrabutylammonium bromide) of 0.140 eq oxirane/100 g polymer.

Preparatory Example 2

An acrylic polymer was made using the same procedure as in Preparatory Example 1, except the amount of EMA was 180.0 g (1.57 mol) and the amount of GMA was 120.0g (0.84 mol). The acrylic polymer was discharged and characterized for solution/chemical properties.

The polymer yielded the following characteristics: a Molecular Mass ($M_w$) of 7,390 Daltons (determined using Gel Permeation Chromatography (GPC from Perkin Elmer; Norwalk, Conn.; columns from Toso Biosep; Montgomeryville, Pa.)); a Molecular Mass ($M_n$) (also determined by Gel Permeation Chromatography) of 1,870 Daltons; Non-volatile Mass or Solids Content (20 minutes at 204 C) of 56.1% by Weight; and an Epoxy Value (using Titration with tetrabutylammonium bromide) of 0.280 eq oxirane/100 g polymer.

Preparatory Example 3

A reaction flask was equipped with a stirrer, condenser tube, and inert gas inlet charged with 28.9 g of butylcellosolve. A sparge of Nitrogen was started, and some light agitation of the reaction flask initiated. The temperature of the flask was set for 170° C. In a separate vessel, a monomer/initiator pre-mix was mixed together: 67.5 g (0.600 mol) of EMA, 45.0 g (0.320 mol) of GMA, and 6.8 g (0.05 mol) of dicumyl peroxide. The mixture was gently stirred until the dicumyl peroxide dissolved. Once the butylcellosolve had reached 170° C., the addition of the monomer/initiator premix was started. The initiator/monomer mixture was added over a period of about 120 minutes. After the addition was complete, the temperature of the reaction flask was maintained for an additional 120 minutes to complete the polymerization process. A temperature range of 165–175° C. was maintained throughout the reaction time. Following the 120 minute holding time, the reaction flask was set for 160° C. Once the reaction had reached 160° C., 1.1 g (0.006 mol) of di-tertamyl peroxide was added and the reaction continued for an additional 60 minutes. At the end of the 60 minute hold period an additional 1.1 g (0.006 mol) of di-tertamyl peroxide was added and held for 60 minutes to polymerize the remaining monomer to a 99.5% or greater conversion. Following this 60 minute hold period, the reaction flask was allowed to cool, under gentle agitation, while the final addition of methyl isobutyl ketone, 50.7 g, occurred over a 45-minute period. The polymer was discharged and characterized for solution/chemical properties.

The polymer yielded the following characteristics: a Molecular Mass ($M_w$) of 4,550 Daltons (determined using Gel Permeation Chromatography (GPC from Perkin Elmer; Norwalk, Conn.; columns from Toso Biosep; Montgomeryville, Pa.)); a Molecular Mass ($M_n$) (also determined by Gel Permeation Chromatography) of 1,260 Daltons; Non-volatile Mass or Solids Content (20 minutes at 204 C) of 55.9% by Weight; and an Epoxy Value (using Titration with tetrabutylammonium bromide) of 0.2810 eq oxirane/100 g polymer.

Preparatory Example 4

Diisobutyl ketone (123.9 lbs.) was added to a clean reaction vessel equipped with a reflux condenser and blanketed with nitrogen ($N_2$). The diisobutyl ketone was heated to 302° F. A monomer/initiator premix containing 396.5 lbs. of ethyl methacrylate, 99.1 lbs. of glycidyl methacrylate, and 19.8 lb. of di-t-butylperoxide was metered into the reactor over a 2.5 to 3 hour time period, while maintaining the temperature of the reaction mixture at 298° F. to 302° F. and under a low to no reflux. After the entire monomer mix was added to the reactor, the reaction mixture was held at 302° F. to 306° F., for two hours, followed by cooling the reaction mixture to 248° F. Then, after adding 188.3 lb. of ethylene glycol monobutyl ether (i.e., butyl cellosolve) to the reaction mixture, the mixture was stirred for 30 minutes. 88.8 lb. of propylene glycol monomethyl ether was then added to the reaction mixture. The resulting reaction product contained 55% by weight of the glycidyl methacrylate-ethyl methacrylate copolymer. The reaction product weighed about 8.37 lb./gal. The copolymer contained about 79.5% ethyl methacrylate and 20.5% glycidyl methacrylate. Gas phase chromatography showed that the copolymer had an $M_w$ of about 19,250 and an $M_n$ of about 4,900.

Examples 5–7

Preparation of Coating Compositions

The acrylic polymers were tested in organosol formulations as a substitute for epoxy novolac (e.g., DEN 438 available from Dow Chemical, Houston, Tex.). The various acrylics were substituted for epoxy novolac on the basis of equivalents oxirane.

The coating compositions were prepared as follows: the toluene, isophorone, MIBK, and butyl Cellosolve were added to a stainless steel mixing vessel. To this vessel was added VMCH with low speed mixing. This mixture was stirred for 30 minutes maintaining a temperature of 30° C. to 44° C. After 30 minutes, the mixture was cooled to below 38° C. and the Cymel 5010, PVC Dispersion, and SL-404 were added with agitation. In a separate stainless steel mixing vessel, the aluminum pigment, isophorone, and either epoxy novolac or EMA/GMA acrylic were slow stirred for 30 minutes. This aluminum slurry was then added to the original mixing vessel and slow stirred for 30 minutes. Finally, the carnauba wax dispersion, butanol, phosphoric acid, toluene, and isophorone were added to the mixing vessel and the complete coating composition was stirred for 15 minutes. The components of the final coating compositions are summarized in Table 1.

TABLE 1

Coating Compositions (in weight percentages)

| Component | Comparative Example 5 | Example 6 | Example 7 |
|---|---|---|---|
| | Epoxy Novolac Stabilized | Used acrylic polymer from Preparatory Example 1 | Used acrylic polymer from Preparatory Example 2 |
| Toluene | 21.32 | 19.77 | 19.77 |
| Isophorone | 12.44 | 11.53 | 11.53 |
| MIBK | 9.58 | 8.88 | 8.88 |
| Butyl Cellosolve | 0.01 | 0.01 | 0.01 |
| VMCH | 8.76 | 8.12 | 8.12 |
| Cymel 5010 | 5.82 | 5.40 | 5.40 |
| PVC Dispersion* | 30.22 | 28.01 | 28.01 |
| SL-404 | 1.17 | 1.08 | 1.08 |
| Aluminum Pigment Paste | 5.07 | 4.70 | 4.70 |
| | Epoxy Novolac Solution | Acrylic polymer | Acrylic polymer |
| Stabilizer | 1.97 | 9.13 | 9.13 |
| Carnauba Wax Dispersion | 1.18 | 1.09 | 1.09 |
| N-Butanol | 2.21 | 2.05 | 2.05 |
| Phosphoric Acid 85% | 0.25 | 0.23 | 0.23 |

TABLE 1-continued

Coating Compositions (in weight percentages)

| Component | Comparative Example 5 | Example 6 | Example 7 |
|---|---|---|---|

*The PVC Dispersion contains dispersion grade PVC particles (GEON 178 available from Polyone; Point Henry, IN) in an organic solvent (AROMATIC 100 available from ExxonMobil; Houston, TX) and a plasticizer (PARAPLEX G25 available from C. P. Hall; Chicago, IL)

Physical Properties of Cured Coating Formulations

Coating compositions were evaluated by applying a coating composition (Examples 5 thru 7, individually) to tin-free steel (TFS) and baking for 20 seconds to a peak metal temperature of 232° C. Each coating compositions was tested at a dry film weight of 1.2 mgs/cm² to 1.6 mgs/cm². Coated steel was then drawn into 54 mm×51 mm beaded cans using a commercial can press (E. W. Bliss; Hastings, Mich.). These cans were then tested for coating adhesion on the upper sidewall, middle sidewall, and lower sidewall. The drawn can adhesion properties of the cured coating compositions are summarized in Table 2.

TABLE 2

Drawn Can Adhesion Properties of Cured Coating Compositions

| Coating | Comparative Example 5 (used Epoxy novolac) | Example 6 (used acrylic polymer from Preparatory Example 1) | 7 (used acrylic polymer from Preparatory Example 2) |
|---|---|---|---|
| Adhesion | | | |
| Upper Sidewall | 10 | 8 | 10 |
| Middle Sidewall | 10 | 10 | 10 |
| Lower Sidewall | 10 | 10 | 10 |

Because the primary end use for the above dried coating formulations is for drawn fish cans, the following food pack protocols were used to test the coating compositions:

Albacore White Tuna in Water:

54 mm×5 mm beaded cans were fabricated from tin-free steel coated with the above coating formulations using a can press (E. W. Bliss Co.; Hastings, Mich.). These cans were then filled with albacore white tuna in water, double seamed, and processed for 90 minutes at 122° C. in a stainless steel pressurized kettle (Innova Process Kettles; Pressure Cooker Model 42010 from Innovation Group Ltd.; Bettendorf, Iowa). The cans were then quenched with water, opened, and evaluated.

Red Sockeye Salmon in Oil:

54 mm×51 mm beaded cans were fabricated from tin-free steel coated with the above coating formulations using a can press (E. W. Bliss Co.; Hastings, Mich.). These cans were then filled with red sockeye salmon packed in oil, double seamed, and processed 60 minutes at 126° C. using a process kettle (Electric Pressure Steam Sterilizer; Wisconsin Aluminum Foundry Co.; Manitowoc, Wis. The cans were cooled to room temperature and stored for 1 week at 50° C. After one week, the cans were opened and evaluated.

The results of the food packs are summarized in Table 3.

TABLE 3

Results of Food Pack Tests

| Coating | Comparative Example 5 Epoxy novolac | Example 6 (used acrylic from Preparatory Example 1) | Example 7 (used acrylic polymer from Preparatory Example 2) |
|---|---|---|---|
| Albacore Tuna in Water Adhesion | | | |
| Upper sidewall | 9 | 9 | 9 |
| Middle sidewall | 10 | 10 | 10 |
| Lower sidewall | 10 | 10 | 10 |
| Blush | 9 | 8 | 9 |
| Surface Stain | 10 | 10 | 10 |
| Corrosion | 10 | 9 | 10 |
| Red Sockeye Salmon in Oil Adhesion | | | |
| Upper sidewall | 10 | 10 | 10 |
| Middle sidewall | 10 | 10 | 10 |
| Lower sidewall | 10 | 10 | 10 |
| Blush | 10 | 10 | 10 |
| Surface Stain | 10 | 10 | 10 |
| Corrosion | 10 | 9 | 10 |

Examples 8–10

Thermal Degradation Testing

A Comparative Example 8 was made having PVC dispersion (50.0 g), and a level of epoxy novolac (DEN 438) known to stabilize PVC.

Example 9 was made using the acrylic polymer from Preparatory Example 1 which was incorporated into a PVC organosol dispersion. The amount of polymer used in the formulation was determined such that there was an equivalent 1:1 oxirane substitution. The amount of stabilizer added compensated for the difference in non-volatile mass between DEN 438 (about 75% NVM) and the acrylic polymer (about 60% NVM).

A "control example" (Comparative Example 10) was also made, and contained neither novolac nor acrylic polymer.

TABLE 4

Compositions (in grams)

| | Comparative Example 8 | Example 9 | Comparative Example 10 |
|---|---|---|---|
| PVC Dispersion | 50.0 | 50.0 | 50.0 |
| Epoxy novolac (DEN 438) | 3.33 | 0 | 0 |
| Acrylic polymer from Preparatory Example 1 | 0 | 16.6 | 0 |

Examples 8, 9 and 10 were then tested for their ability to stabilize PVC from thermal degradation.

Samples from each composition were applied to tinplate and baked 1 minute to a peak metal temperature of 232° C. in a conventional force draft oven (Precision Scientific Oven; Precision Scientific; Chicago, Ill.). The metal was scratched with steel wool prior to baking to expose the iron under the tin treatment. This was done because iron catalyzes the degradation of PVC, thus testing the stabilizer in a "worst case scenario." After baking, the panels were evaluated as to the extent of burned PVC.

The sample without any acrylic polymer stabilizer nor epoxy novolac (Comparative Example 10) was completely burned and charred. It appeared as ash particles floating around in the oven.

The samples stabilized with DEN 438 (Comparative Example 8) and acrylic polymer (Example 9) both did not burn. Both Comparative Example 8 and Example 9 turned gold in color with no evident charring of the PVC.

Examples 11–13

Preparation of Coating Compositions with Acrylics of Varying Molecular Weight Coating compositions were made that contained acrylic polymers of varying molecular weight. Following the procedure used in Examples 5–7, three different acrylics were incorporated into a organosols to produce coating compositions 11 thru 13. These compositions were tested and compared to a similar coating made with epoxy novolac (Comparative Example 5). The respective acrylics were substituted for epoxy novolac on the basis of equivalents oxirane. The components of the final coating compositions are summarized in Table 5.

TABLE 5

Coating composition of Examples 11–13 (weight percentages)

| Component | Example 11 | Example 12 | Example 13 |
|---|---|---|---|
| Toluene | 20.67 | 20.67 | 19.50 |
| Isophorone | 12.06 | 12.06 | 11.44 |
| MIBK | 9.30 | 9.30 | 8.81 |
| Butyl Cellosolve | 0.01 | 0.01 | 0.01 |
| VMCH | 8.49 | 8.49 | 8.05 |
| Cymel 5010 | 5.64 | 5.64 | 5.35 |
| PVC Dispersion | 29.29 | 29.29 | 27.78 |
| SL-404 | 1.13 | 1.13 | 1.07 |
| Aluminum Pigment Paste | 4.92 | 4.92 | 4.66 |
| | Acrylic polymer from Preparatory Example 3 | Acrylic polymer from Preparatory Example 2 | Acrylic Polymer from Preparatory Example 4 |
| Stabilizer | 4.97 | 4.97 | 9.88 |
| Carnauba Wax Dispersion | 1.14 | 1.14 | 1.09 |
| N-Butanol | 2.14 | 2.14 | 2.03 |
| Phosphoric Acid 85% | 0.24 | 0.24 | 0.23 |

Coating compositions Examples 11–13 were evaluated by applying the composition (individually) to tin-free steel (TFS) and baking for 20 seconds to a peak metal temperature of 232° C. The coating compositions were tested at a dry film weight of 1.2 mgs/cm$^2$ to 1.6 mgs/cm$^2$. The coated steel was then fabricated into 54 mm×51 mm beaded cans. These cans were then tested for coating adhesion on the upper sidewall, middle sidewall, and lower sidewall. Additionally, cans coated with these formulations were tested using the food pack protocols outlined above. The results of this testing are summarized in Table 6, which also provides the results from the same tests performed on Comparative Example 5.

TABLE 6

Performance of dried coating formulations made from acrylics of varying Molecular Weight

| Coating | Example 11 | Example 12 | Example 13 | Comparative Example 5 |
|---|---|---|---|---|
| Adhesion | | | | |
| Upper sidewall | 10 | 9 | 9 | 10 |
| Middle sidewall | 10 | 10 | 10 | 10 |
| Lower sidewall | 10 | 10 | 10 | 10 |
| Albacore Tuna in Water Adhesion | | | | |
| Upper sidewall | 7 | 9 | 6 | 9 |
| Middle sidewall | 10 | 10 | 10 | 10 |
| Lower sidewall | 10 | 10 | 10 | 10 |
| Blush | 10 | 9 | 8 | 9 |
| Surface Stain | 10 | 10 | 10 | 10 |
| Corrosion | 10 | 10 | 10 | 10 |
| Red Sockeye Salmon in Oil Adhesion | | | | |
| Upper sidewall | 9 | 10 | 10 | 10 |
| Middle sidewall | 10 | 10 | 10 | 10 |
| Lower sidewall | 10 | 10 | 10 | 10 |
| Blush | 10 | 10 | 10 | 9 |
| Surface stain | 9 | 10 | 10 | 9 |
| Corrosion | 10 | 10 | 10 | 10 |

Examples 14–15

Thermal Degradation Testing

A Comparative Example 14 was made having PVC dispersion (50.0 g), and a level of epoxy novolac (DEN 438) known to stabilize PVC.

Example 15 was made using the acrylic polymer from Preparatory Example 4 which was incorporated into a PVC organosol dispersion. The amount of polymer used in the formulation was determined such that there was an equivalent 1:1 oxirane substitution. The amount of stabilizer added compensated for the difference in non-volatile mass between DEN 438 (about 75% NVM) and the acrylic polymer (about 60% NVM).

The "control example" (Comparative Example 10—containing neither novolac nor acrylic polymer) was also tested.

TABLE 7

Compositions (in grams)

| | Comparative Example 14 | Example 15 | Comparative Example 10 |
|---|---|---|---|
| PVC Dispersion | 50.0 | 50.0 | 50.0 |
| Epoxy novolac (DEN 438) | 3.33 | 0 | 0 |
| Acrylic polymer from Preparatory Example 4 | 0 | 17.8 | 0 |

All three were then tested for their ability to stabilize PVC from thermal degradation. Samples from each composition were applied to tinplate and baked 1 minute to a peak metal temperature of 232° C. in a conventional force draft oven (Precision Scientific Oven; Precision Scientific; Chicago, Ill.). The metal was scratched with steel wool prior to baking to expose the iron under the tin treatment. This was done because iron catalyzes the degradation of PVC, thus testing the stabilizer in a "worst case scenario". After baking, the panels were evaluated as to the extent of burned PVC.

The sample without any acrylic polymer stabilizer nor epoxy novolac (Comparative Example 10) was completely burned and charred. It appeared as ash particles floating around in the oven.

The samples stabilized with DEN 438 (Comparative Example 14) and acrylic polymer (Example 15) both did not burn. Both Comparative Example 14 and Example 15 turned gold in color with no evident charring of the PVC.

A number of embodiments of the invention have been described. Nevertheless, it will be understood that various modifications may be made without departing from the spirit and scope of the invention. Accordingly, other embodiments are within the scope of the following claims.

What is claimed is:

1. A coating composition comprising:
    an epoxy functionalized stabilizer comprising a monomeric unit derived from a glycidyl ester of an α,β-unsaturated acid, or an anhydride thereof; and
    a thermoplastic dispersion, wherein said thermoplastic dispersion is a vinyl organosol.

2. The coating composition of claim 1, wherein said acid is selected from the group consisting of acrylic acid, methacrylic acid, ethacrylic acid, α-chloroacrylic acid, α-cyanoacrylic acid, β-methylacrylic acid (crotoruc acid), α-phenylacrylic acid, α-acryloxypropionic acid, sorbic acid, α-chlorosorbic acid, angelic acid, cinnamic acid, p-chlorocinnamic acid, β-stearylacrylic acid, itaconic acid, citraconic acid, mesaconic acid, glutaconic acid, aconitic acid, maleic acid, fumaric acid, tricarboxyethylene, maleic anhydride, and mixtures thereof.

3. The coating composition of claim 1, wherein said acid is selected from the group consisting of acrylic acid and methacrylic acid.

4. The coating of claim 1, wherein said stabilizer further comprises a monomeric unit derived from an alkyl (meth)acrylate having the structure:

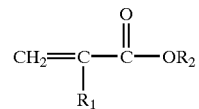

wherein $R_1$ is hydrogen or methyl, and $R_2$ is an alkyl group having one to sixteen carbon atoms.

5. The coating composition of claim 4, wherein $R_1$ is methyl and $R_2$ is an alkyl group having two to eight carbon atoms.

6. The coating composition of claim 4, wherein $R_1$ is methyl and $R_2$ is an alkyl group having two to four carbon atoms.

7. The coating composition of claim 4, wherein the stabilizer is a copolymer comprising a first monomeric unit derived from glycidyl methacrylate (GMA) and a second monomeric unit derived from ethyl methacrylate (EMA).

8. The coating composition of claim 1, wherein said vinyl organosol is a polyvinyl chloride organosol.

9. The coating composition of claim 1, wherein the epoxy functionalized stabilizer has a weight average molecular weight of about 2,000 to about 15,000.

10. The coating composition of claim 1, wherein the stabilizer has a weight average molecular weight of about 4,000 to about 8,000.

11. A coating composition comprising:
(a) an epoxy functionalized stabilizer, wherein the stabilizer is a copolymer comprising 20% to 90% by weight of a first a monomeric unit derived from a glycidyl ester of an α,β-unsaturated acid, or an anhydride thereof and 80% to 10% of a second monomeric unit derived from derived from an alkyl (meth)acrylate having the structure:

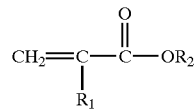

wherein $R_1$ is hydrogen or methyl, and $R_2$ is an alkyl group having one to sixteen carbon atoms; and
(b) a thermoplastic dispersion, wherein said thermoplastic dispersion is a vinyl organosol.

12. The coating composition of claim 11, wherein the first monomeric unit is derived from glycidyl methacrylate (GMA) and the second monomeric unit derived from ethyl methacrylate (EMA).

13. The coating composition of claim 11, further comprising a monomeric unit derived from a monounsaturated monomer.

14. The coating composition of claim 11, wherein said thermoplastic dispersion comprises thermoplastic particles dispersed in at least one of an organic solvent, a plasticizer or a combination thereof.

15. The coating composition of claim 14, wherein the thermoplastic particles comprise a halogenated polyolefin.

16. The coating composition of claim 14, wherein said thermoplastic particles are polyvinylchloride.

17. A container with the coating composition of claim 11 applied to at least one surface thereof.

18. A method for making a coated container comprising:
(1) applying to a container a coating composition comprising:
(a) an epoxy functionalized stabilizer, wherein the stabilizer is a copolymer comprising 20% to 90% by weight of a first a monomeric unit derived from a glycidyl ester of an α,β-unsaturated acid, or an anhydride thereof; and 80% to 10% of a second monomeric unit derived from derived from an alkyl (meth)acrylate having the structure:

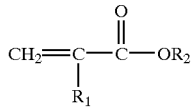

wherein $R_1$ is hydrogen or methyl, and $R_2$ is an alkyl group having one to sixteen carbon atoms; and
(b) a vinyl organosol; and
(2) curing said coating composition to form a coating.

19. The method of claim 18, wherein said coating is free of bisphenol-A.

20. The method of claim 18, wherein said coating is free of bisphenol-A-diglycidylether.

21. The method of claim 18, wherein said coating is free of bisphenol-F.

22. The method of claim 18, wherein said coating is free of bisphenol-F-diglycidylether.

23. A method, comprising:
(1) applying to a substrate a coating composition comprising:
(a) an epoxy functionalized stabilizer, wherein the stabilizer is a copolymer comprising 20% to 90% by weight of a first a monomeric unit derived from a glycidyl ester of an α,β-unsaturated acid, or an anhydride thereof; and 80% to 10% of a second monomeric unit derived from derived from an alkyl (meth)acrylate having the structure:

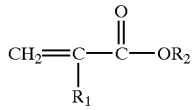

wherein $R_1$ is hydrogen or methyl, and $R_2$ is an alkyl group having one to sixteen carbon atoms; and
(b) a thermoplastic dispersion, wherein said thermoplastic dispersion is a vinyl organosol,
(2) curing said coating composition to form a coating on the substrate; and
(3) forming a container from the coated metal substrate.

24. The method of claim 23, further comprising:
(4) placing food into said container.

* * * * *

UNITED STATES PATENT AND TRADEMARK OFFICE
CERTIFICATE OF CORRECTION

PATENT NO. : 6,916,874 B2
APPLICATION NO. : 10/224183
DATED : July 12, 2005
INVENTOR(S) : John H. Mazza It is certified that error appears in the above-identified patent and that said Letters Patent is hereby corrected as shown below:

Col. 2, Line 1, "ester of an I,J" should be --ester of an $\alpha\beta$--

Col. 12, Line 47, "54 mm x 5 mm" should be --54 mm x 51 mm--

Col. 12, Line 65, "Manitowoc, Wis." should be --Manitowoc, Wis.)--

Col. 16, Line 29, Claim 2, "$\alpha$ –acryloxypropionic acid" should be -- $\beta$ –acryloxypropionic acid--

Col. 17, Line 46, Claim 18, "monomeric unit derived from derived from an alkyl" should be --monomeric unit derived from an alkyl--

Col. 18, Line 29, Claim 23, "monomeric unit derived from derived from an alkyl" should be --monomeric unit derived from an alkyl--

Signed and Sealed this

Twenty-fifth Day of December, 2007

JON W. DUDAS
*Director of the United States Patent and Trademark Office*